(12) United States Patent  (10) Patent No.: US 8,328,213 B1
Crawford  (45) Date of Patent: Dec. 11, 2012

(54) OPERATOR POWERED VEHICLE AND METHOD OF USE

(76) Inventor: Robert Crawford, Boca Raton, FL (US)

( * ) Notice: Subject to any disclaimer, the term of this patent is extended or adjusted under 35 U.S.C. 154(b) by 0 days.

(21) Appl. No.: 13/031,591

(22) Filed: Feb. 21, 2011

Related U.S. Application Data

(62) Division of application No. 12/197,245, filed on Aug. 23, 2008, now Pat. No. 7,891,686.

(60) Provisional application No. 61/013,080, filed on Dec. 12, 2007.

(51) Int. Cl.
*B60M 1/04* (2006.01)

(52) U.S. Cl. .......................... 280/233; 280/254; 280/282

(58) Field of Classification Search .................. 280/233, 280/234, 235, 253, 254, 282
See application file for complete search history.

(56) References Cited

U.S. PATENT DOCUMENTS

| | | | | |
|---|---|---|---|---|
| 1,503,832 A * | 8/1924 | Hubbard | ..................... | 280/234 |
| 3,895,825 A * | 7/1975 | Sink | ..................... | 280/234 |
| 4,773,663 A | 9/1988 | Sawyer et al. | | |
| 4,838,568 A | 6/1989 | Arroyo | | |
| 4,861,055 A * | 8/1989 | Jones | ..................... | 280/234 |
| 4,925,200 A * | 5/1990 | Jones | ..................... | 280/233 |
| 4,928,986 A | 5/1990 | Carpenter | | |
| 5,039,122 A | 8/1991 | Deutch et al. | | |
| 5,078,416 A | 1/1992 | Keyes | | |
| 5,280,936 A | 1/1994 | Schmidlin | | |
| 5,775,708 A * | 7/1998 | Heath | ..................... | 280/234 |
| 6,123,635 A | 9/2000 | Farmos | | |
| 6,129,646 A | 10/2000 | Farmos | | |
| 6,378,882 B1 * | 4/2002 | Devine | ..................... | 280/234 |
| 6,578,861 B2 | 6/2003 | Park | | |
| 6,663,127 B2 | 12/2003 | Miller | | |
| 6,716,141 B2 | 4/2004 | Bhoopathy | | |
| 7,000,934 B1 * | 2/2006 | Capek | ..................... | 280/234 |
| 7,048,289 B2 | 5/2006 | Lau | | |
| 7,223,210 B2 * | 5/2007 | Krul et al. | ..................... | 482/57 |

* cited by examiner

*Primary Examiner* — Kevin Hurley
(74) *Attorney, Agent, or Firm* — Allen D. Hertz, P.A.; Allen D. Hertz

(57) ABSTRACT

A vehicle powered by an operator's arms and/or legs utilizes a pivot column for propulsion. An upper propulsion member (handlebar) is provided on the upper end of the pivot column. A lower propulsion member (foot bar) is provided on the lower end of the pivot column. A drive propulsion system is provided between the pivot column bottom and a rotational drive gear set. The drive propulsion system engaged with said at least one rotational drive gear, the propulsion system engages with and provides propulsion to an upper portion of the rotational drive gear during a counterclockwise motion of the pivot column and engages with and provides propulsion to a lower portion of the rotational drive gear during a clockwise motion of the pivot column. The rotational drive gear spins freely when subjected to the reverse motion. Incorporating two gears with opposing propulsion drives provides forward motion throughout the entire reciprocating stroke of the pivot column.

20 Claims, 5 Drawing Sheets

OPERATOR POWERED VEHICLE AND METHOD OF USE

CROSS-REFERENCE TO RELATED APPLICATION

This application is a Divisional Application of U.S. patent application Ser. No. 12/197,245, filed on Aug. 23, 2008, now U.S. Pat. No. 7,891,686 which is a Non-Provision Application claiming benefit of U.S. Provisional Patent Application Ser. No. 61/013,080, filed on Dec. 12, 2007, which is incorporated herein in its entirety.

FIELD OF THE INVENTION

This invention relates to arm and leg powered cycles, and more specifically to a vehicle powered by a linear, reciprocating "rowing" motion of an operator's arms and legs. The invention may be used for exercise as well as transportation.

BACKGROUND OF THE INVENTION

Numerous variations of bicycles, tricycles, and other vehicles are known in the prior art, for providing excellent devices for exercise and transportation. However, these vehicles typically have used only the operator's legs moving in a circular motion as a means to provide power. This exclusive reliance on leg power significant inhibits the potential exercise benefits, which could be enhanced if the device were to utilize both the arms and the legs to provide power. Similarly, utilizing the power of the arms to supplement that provided by the legs could allow greater speeds to be achieved and maintained. In addition, persons without the use of their legs, and who would not be able to use a conventional leg-powered cycle, could nonetheless operate a vehicle, which utilized arm power.

Several cycle designs utilising both arm and leg power are known in the prior art. One example is shown in U.S. Pat. No. 1,020,432 to McBarnes, which discloses a bicycle powered by a linear reciprocating motion of the arms and legs. However, the McBarnes cycle requires simultaneous use of the arms and legs, which deprives the operator of the option of choosing an optimum combination of arm and leg usage. In addition, such a device would not be suitable for people that are handicapped in the use of their legs.

Another example is shown in U.S. Pat. No. 4,928,986 to Carpenter, which discloses a bicycle powered by the operator's arms and legs. Carpenter utilises a chain driven gear on a pulling or drive stroke. This limits the exercise to one-half of the operator's total motion.

Various attempts have been made to solve this problem, but the solutions have often required cumbersome and heavy equipment. In addition, the prior art configurations have also sometimes rendered operation of the vehicle awkward, and in particular have had less than optimum results with steering the vehicles. Examples of vehicles that permit the arms and legs to be used jointly or independently are shown in U.S. Pat. Nos. 3,760,905 to Dower and 4,508,358 to Erel. Further examples of background art may be seen in U.S. Pat. No. 4,541,647 to Braun and Soviet Union Patent No. 1,065,279.

What is desired is a manually operated drive system, which can be operated by an operator's arms, legs, or both. It is desirable that the apparatus provide resistance to the operator during all directions of the stroke.

SUMMARY OF THE PRESENT INVENTION

The present invention is generally directed to an operator-powered vehicle, more specifically via the operator's arms and legs. The manually propelled drive train utilises a pair of drive gears, each engageably coupled with a drive wheel in a drive direction rotation and free spinning in a non-drive rotation. Propulsion is applied to drive wheel via a force applied to the upper portion of the drive gear during a forward stroke and the lower portion of a drive gear during a rearward stroke. The propulsion force is provided by a reciprocating or "rowing" motion applied by the operator. The reciprocating motion is provided via a pivoting column. Handlebars are assembled to an upper end of the column and foot pedals are assembled to a lower end of the column. This configuration ensures the propulsion motion is provided throughout the entire reciprocating stroke. Further, the configuration allows power to be supplied using the legs and arms, jointly or independently.

In one aspect of the invention, the operator-powered vehicle comprises:
  a vehicle assembly comprising a frame, a seat disposed upon said frame, at least two wheels, and a steering mechanism,
  a pivoting column pivotally coupled to said frame;
  a handlebar disposed upon an upward extension of the pivoting column;
  a drive beam disposed upon a lower extension of the pivoting column;
  a pair of foot pedals disposed upon a cross member extending from the lower extension of the pivoting column;
  at least one rotational drive gear engaged with a drive wheel when rotated in a drive direction rotation and free-spinning when rotated in a non-drive (opposing) rotation, wherein the at least one drive gear drive engages with the drive beam.

In yet another aspect of the invention, the drive beam has an upper gear interface and a lower gear interface. The upper gear interface engages with an upper portion of the rotational drive gear. The lower gear interface engages with a lower portion of the rotational drive gear.

Referring to another aspect, the assembly incorporates a pair of rotational drive gears.

While another aspect incorporates a gear engagement retaining bearing ensuring the gear interface remains engaged with the rotational drive gear.

And another aspect couples the drive beam to the pivot column via a moveable interface, such as a pivot, a slide, and the like.

The vehicle can be fabricated in any of a variety of form factors, including a bicycle, a trike, a four-wheeled vehicle, and the like.

The reciprocating system can include adjusting means, allowing the handlebars to be adjustably positioned and similarly allowing the foot posts to also be adjustable.

A steering system is incorporated via a steering arm attached to each of the handlebar assembly and the front forks via a steering linkage.

With another aspect incorporating clips onto the foot pedals, providing a means for the operator to utilize their legs for both a forward and a rearward propulsion motion.

These and other aspects, features, and advantages of the present invention will become more readily apparent from the attached drawings and the detailed description of the preferred embodiments, which follow.

BRIEF DESCRIPTION OF THE DRAWINGS

For the purpose of initially illustrating the invention, the specification presents drawings, flow diagrams, and embodiments that are presently preferred, as well as alternates. It should be understood, however, that the invention is not limited to the specific instrumentality and methods disclosed herein. It can be recognized that the figures represent a layout in which persons skilled in the art may make variations therein. In the drawings.

Like reference numerals refer to like parts throughout the various views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the Figures, the present invention is generally directed to an operator-propelled vehicle, more specifically, an arm and leg powered trike, which provides exercise to the operator during the complete cycle of each propulsion stroke.

Figure 1:
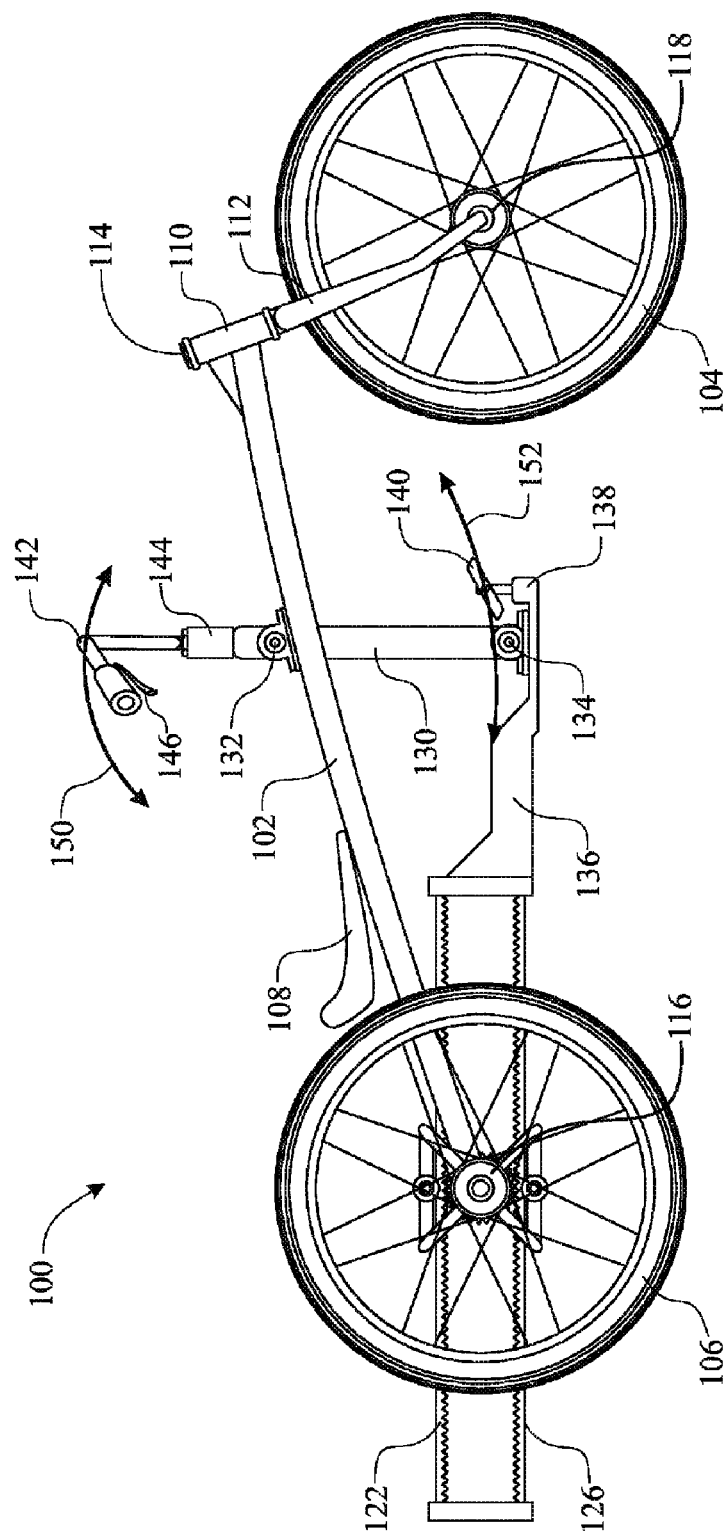
FIG. 1 presents a right side, elevation view of an exemplary embodiment of the present invention in the form of a trike illustrating the operator's motion for propulsion.

An operator-powered vehicle 100 is presented in an exemplary form factor of a trike as illustrated in FIGS. 1 through 5. The general components of the trike are presented in FIGS. 1 and 2. The trike comprising a "V" shaped vehicle frame 102, placing the mating portion along a forward end and the spanning end along a rear end. A fork receptacle 110 is disposed at the forward end of the vehicle frame 102. The fork receptacle 110 can be optionally reinforced via the inclusion of a gusset as illustrated. An axle shaft 170 and a rear frame structure 174 are disposed spanning the rear end of the vehicle frame 102. The vehicle frame 102 can be fabricated out of any shaped cross section and materials. The initial production units assemble a vehicle frame 102 having a rectangular cross sectional shape that is slightly curved along its length (as shown in FIG. 1). The fork receptacle 110 is fabricated of a circular shaped, tubular material and welded to the forward end of the vehicle frame 102. The axle shaft 170 is provided having a circular, tubular cross sectional shape and preferably extending outward from the rear end of each of a left and a right side frame section. The rear end of the frame is supported via the rear frame structure 174. The rear frame structure 174 can be fabricated of round bar stock, tubular bar stock, and the like. The rear frame structure 174 spans the width of the rear end of the operator-powered vehicle 100, spanning from each of the two outer ends of the pair of axle shafts 170. A rear frame center member 176 is assembled, being generally centered and perpendicular to the rear frame structure 174. An axel 172 is disposed through the tubular section of the axle shaft 170. A rear hub 116 is provided on each end of the axel 172, for engaging with a trailing wheel 106. A front forks 112 is rotationally assembled to the vehicle frame 102 by inserting a neck (not shown, but understood) through the fork receptacle 110 and secured via a fork fastener 114 disposed at an opposing end of the fork receptacle 110. A leading wheel 104 is rotationally assembled to a distal end of the front forks 112 via a front hub 118. A saddle 108 is disposed upon the vehicle frame 102, preferably being positionally adjustable along the longitudinal axis of the vehicle frame 102. This can be accomplished via a variety of designs. A central frame section 103 is defined as a section of the frame spanning between the forward end and the saddle 108. It is understood that the operator-powered vehicle 100 may include a set of wheels 104, 106, wherein each wheel is in rotational communication with the vehicle frame 102.

Figure 2:
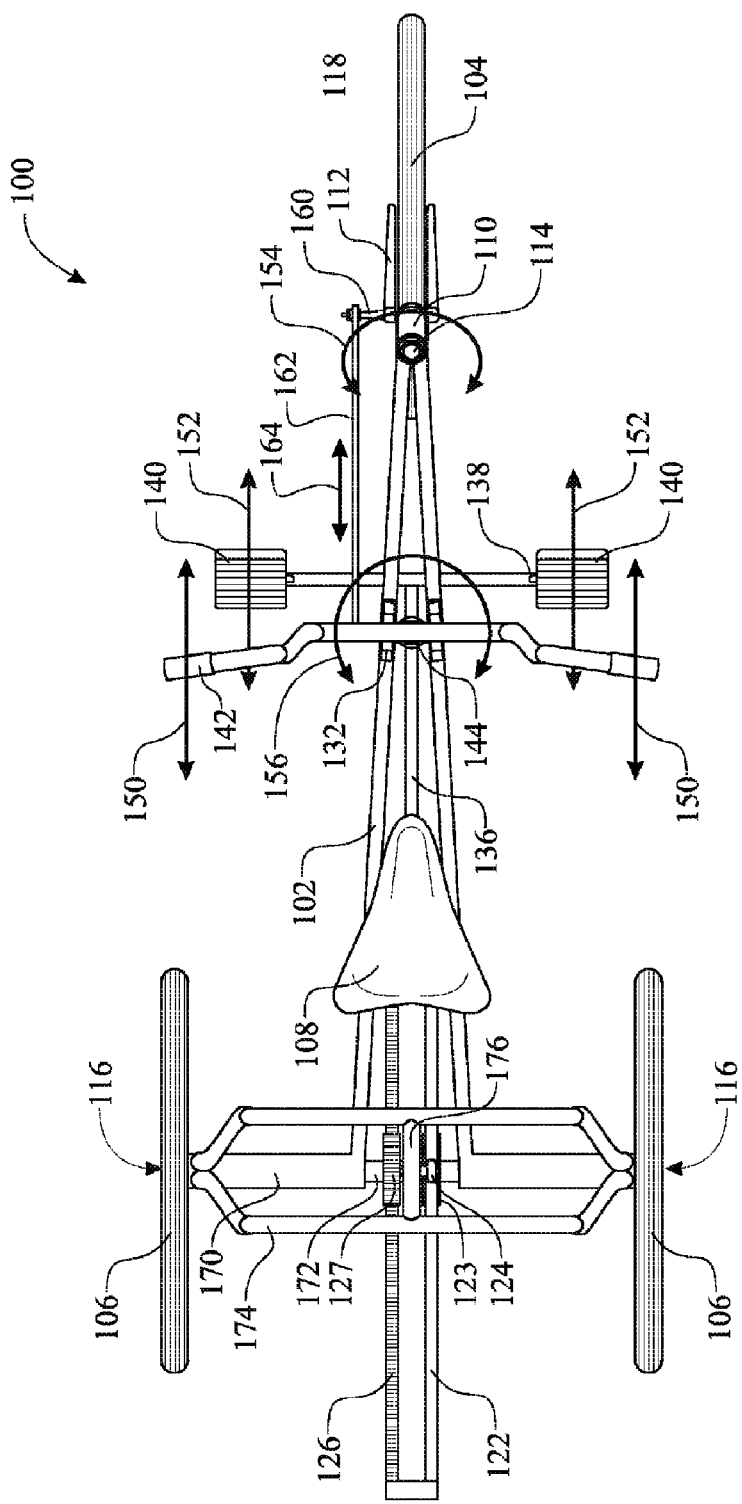
FIG. 2 presents a top, planar view of the trike of FIG. 1, illustrating the operator's motion for propulsion, and introducing the steering mechanism.

Steering is provided via a steering system, such as via an exemplary embodiment illustrated in FIG. 2. An upper propulsion member commonly referred to as a handlebars 142, is disposed upon a pivot column 130 via a handlebar receptacle 144 rotationally assembled to an upper portion of the pivot column 130. The handlebars 142 extends outwardly from the pivot column 130, extending to a left and right side of the frame and is rigidly assembled to the handlebar receptacle 144. The handlebar receptacle 144 is fabricated of a tubular component that is placed over a post member projecting from the upper portion of the pivot column 130. Bearing sets (understood, but not shown) can be incorporated in each end of the handlebar receptacle 144 for longevity. A fork steering arm 160 extends from each of the front forks 112 (as shown) and the handlebar receptacle 144 (understood and similar to the component extending from the front forks 112). A steering linkage 162 extends between each of the two fork steering arm 160, being secured via a linkage rod end. The steering linkage 162 can comprise at least one threaded end providing adjustments for alignment between the handlebars 142 and the front forks 112. The operator rotates the handlebars 142 via a front wheel directional motion 156, causing the steering linkage 162 to move in accordance to a linkage motion 164. The linkage motion 164 is then translated into a steering wheel motion 154, rotating the leading wheel 104 and steering the operator-powered vehicle 100. The fork steering arm 160 secured to the handlebar receptacle 144 is configured locating the interface between the fork steering arm 160 and the steering linkage 162 at a position that is in line with the axis of the primary pivot 132. This eliminates any impact of the pivoting motion of the handlebar receptacle 144 into the steering means.

Braking can be provided utilising any of the commonly known braking systems. The braking is represented via a brake actuator 146 disposed upon the handlebars 142.

Propulsion of the operator-powered vehicle 100 is provided in a unique manner. Propulsion energy is provided by a reciprocating motion of the pivot column 130. The handlebars 142 are provided at an upper end of the pivot column 130. A lower propulsion member is provided as a pair of pedals 140 (operator foot interfaces) is rotationally coupled to a foot pedal post 138 disposed upon a lower end of the pivot column 130. The foot pedal post 138 extends outwardly from the pivot column 130, extending to a left and right side of the frame. The operator uses their arms, providing a reciprocating motion to the handlebars 142.

Figure 3:
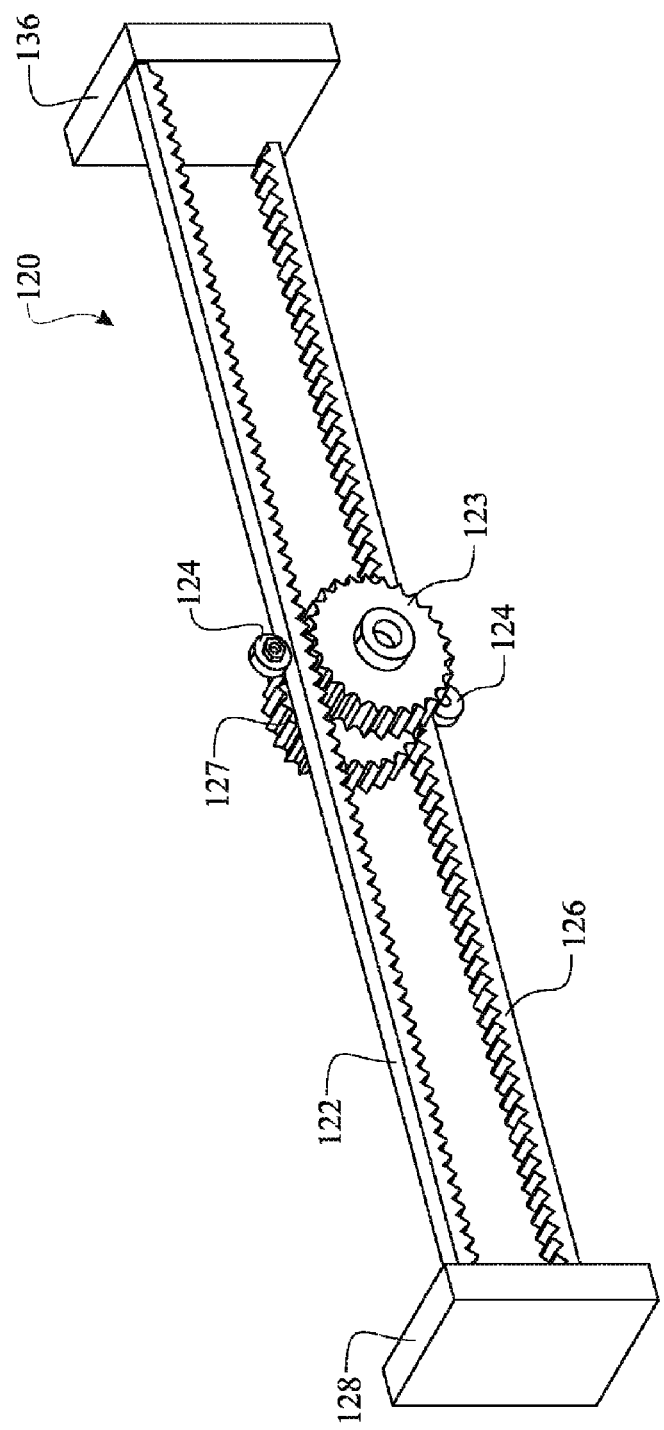
FIG. 3 presents an isometric, detailed view of an exemplary linear drive mechanism.

The key to the propulsion is referred to as a drive assembly 120 illustrated in FIG. 3. The drive assembly 120 incorporates an upper linear drive gear 122 and a lower linear drive gear 126 spanning between two ends. The forward end being a drive beam 136, the rear end being a linear gear drive rear member 128. The upper linear drive gear 122 is registered to an upper portion of an upper engaging rotational drive gear 123. The lower linear drive gear 126 is registered to a lower portion of a lower engaging rotational drive gear 127. Engagement between the upper linear drive gear 122 and the upper portion of the upper engaging rotational drive gear 123 is provided via a gear engagement retaining bearing 124. Engagement between the lower linear drive gear 126 and the upper portion of the lower engaging rotational drive gear 127 is provided via a second gear engagement retaining bearing 124. The gear engagement retaining bearings 124 are assembled to the rear frame center member 176. A flange can be disposed upon each inner and outer edges of the gear engagement retaining bearing 124 to aid in maintaining alignment between the linear gears 122, 126 and the rotational drive gears 123, 127.

Figure 4:
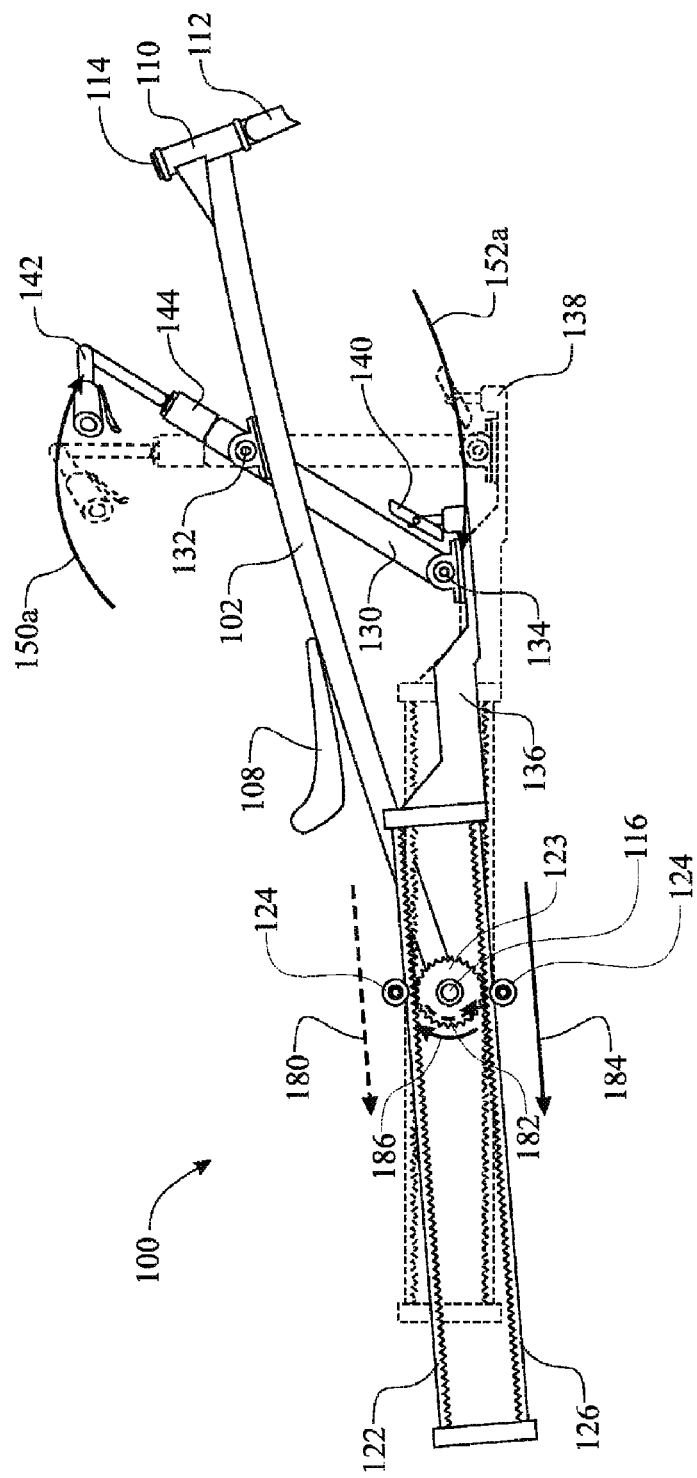
FIG. 4 presents a side elevation view, demonstrating a clockwise, pivoting motion of the propulsion system and the resulting drive movement.
Figure 5:
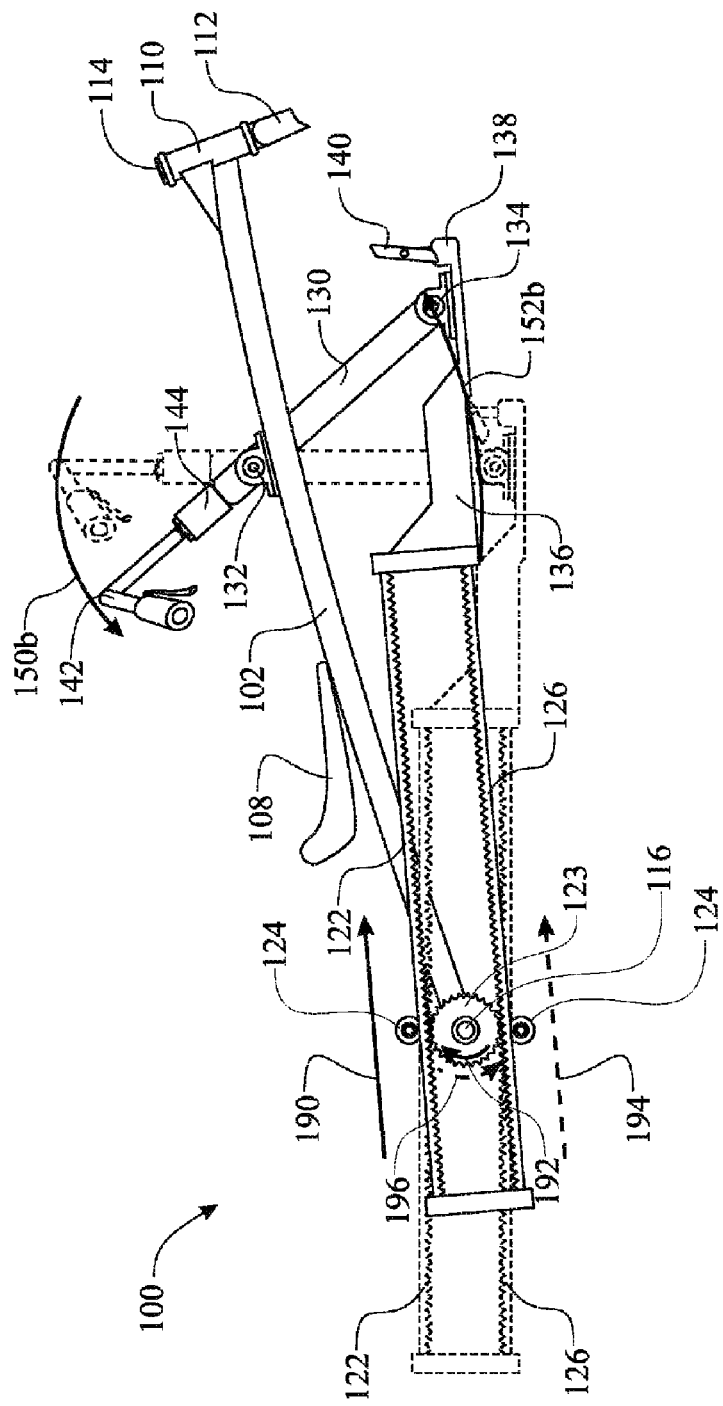
FIG. 5 presents a side elevation view, demonstrating a counter-clockwise, pivoting motion of the propulsion system and the resulting drive movement.

The operation of the propulsion system is best demonstrated in the illustrations of FIGS. 4 and 5. A clockwise stroke portion is represented in FIG. 4 and a counter-clockwise stroke portion is represented in FIG. 5. The pivot column 130 is pivotally assembled to the vehicle frame 102 via a pair of primary pivots 132. The primary pivot 132 is provided on each side of the pivot column 130 and secured to the vehicle frame 102. An axle is provided between the primary pivot 132 and through the pivot column 130. The location of the pivoting interface provides the fulcrum, defining the cantilevered forces. The force can be made adjustable by adjusting the fulcrum position, making the height of the handlebars 142 adjustable, and the like. The operator rests on the saddle 108, holding the handlebars 142 with their hands, and resting their feet on the pedals 140.

In accordance with a first portion of a stroke, the operator would apply a forward force to the handlebars 142, in accordance with a forward (clockwise) handlebar motion 150a. The pedals 140 can include commonly known pedal clips allowing the operator to use their feet to pull the pedals 140 rearward, in accordance with the rearward (clockwise) foot pedal motion 152a. The clockwise rotation of the pivot column 130 engages with the drive beam 136 via a drive pivot 134, resulting in a rearward motion of the drive assembly 120. The rearward motion is transferred to the drive gears 123, 127 as follows: The lower linear drive gear 126 moves in accordance with a lower linear drive gear rearward motion 184. The lower linear drive gear 126 engages with the lower engaging rotational drive gear 127 (hidden behind the upper engaging rotational drive gear 123), causing a clockwise gear propulsion motion 186. The lower engaging rotational drive gear 127 engages with the axel 172 providing a rotational drive force to the trailing wheel 106. The upper linear drive gear 122 moves in accordance with an upper linear drive gear rearward motion 180. The upper linear drive gear 122 engages with the upper engaging rotational drive gear 123 causing a counterclockwise gear freewheel motion 182. The upper engaging rotational drive gear 123 free-spins in a counter-clockwise motion. The linear gears 122, 126, remain engaged with the drive gears 123, 127 via a pair of gear engagement retaining bearings 124.

In accordance with a second portion of a stroke, the operator would apply a rearward force to the handlebars 142, in accordance with a rearward (counterclockwise) handlebar motion 150b. The counterclockwise rotation of the pivot column 130 continues engagement with the drive beam 136 via the drive pivot 134, resulting in a forward motion of the drive assembly 120. The forward motion is transferred to the drive gears 123, 127 as follows: The lower linear drive gear 126 moves in accordance with a lower linear drive gear forward motion 194. The lower linear drive gear 126 engages with the lower engaging rotational drive gear 127 (hidden behind the upper engaging rotational drive gear 123), causing a counter-clockwise gear freewheel motion 196. The upper engaging rotational drive gear 123 engages with the axel 172 continuing the rotational drive force to the trailing wheel 106. The upper linear drive gear 122 moves in accordance with an upper linear drive gear forward motion 190. The upper linear drive gear 122 engages with the upper engaging rotational drive gear 123 causing a clockwise gear propulsion motion 192. The lower engaging rotational drive gear 127 free-spins in a counter-clockwise motion. The linear gears 122, 126, remain engaged with the drive gears 123, 127 via the pair of gear engagement retaining bearings 124.

The unique drive train illustrated herein provides a system, which optimally exercises the operator's arm, legs, or both, while applying a continuous propulsion force to the drive wheels 106. By integrating a pair of gears 123, 127, each engaged in a clockwise direction and free spinning in a counterclockwise direction ensures continuous propulsion to the vehicle. The interface shown teaches a linear gear engageably coupled to a rotational drive gear. It is recognized that other such gear interfaces can be provided interfacing with a pair of drive gears 123, 127.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of manually propelling a vehicle, the method comprising steps:
   obtaining an operator-powered vehicle, said operator-powered vehicle comprising:
      a frame having a forward end terminating at a front fork receptacle, and a rear end, said frame is defined having a central frame section located between said forward end and a seat, wherein said seat is attached to said frame;
      a front fork having a wheel supporting segment extending downward from said front fork receptacle;
      at least one leading wheel rotationally carried by said wheel supporting segment;
      at least one trailing wheel rotationally assembled to a trailing end of said vehicle;

a pivot column pivotally engaging with said central frame section, rotating about a horizontal axis that is substantially perpendicular to a longitudinal axis of said frame;

at least one rotational drive gear engaged with at least one of said wheels;

a propulsion system providing communication between said pivot column and said at least one rotational drive gear;

pivoting said pivot column whereby said pivotal motion of said pivot column causes said propulsion system to apply a rotational torque to said at least one rotational drive gear, wherein said at least one rotational drive gear rotates said at least one of said wheels.

2. A method of manually propelling a vehicle as recited in claim 1, the method further comprising a step of:

pushing an upper section of said pivot column away from said seat by a pressing against an upper propulsion member carried by said upper portion of said pivot column.

3. A method of manually propelling a vehicle as recited in claim 2, the method further comprising a step of:

pulling said upper section of said pivot column towards said seat by a pulling said upper propulsion member carried by said upper portion of said pivot column.

4. A method of manually propelling a vehicle as recited in claim 3, the method further comprising a step of:

pushing a lower section of said pivot column away from said seat by a pressing a lower propulsion member carried by said lower portion of said pivot column.

5. A method of manually propelling a vehicle as recited in claim 2, the method further comprising a step of:

pushing a lower section of said pivot column away from said seat by a pressing a lower propulsion member carried by said lower portion of said pivot column.

6. A method of manually propelling a vehicle as recited in claim 5, the method further comprising a step of:

apply a rotational torque to said at least one rotational drive gear, wherein said rotational torque is applied to an upper portion of said at least one rotational drive gear during a first directional pivot of said pivot column and said rotational torque is applied to a lower portion of said at least one rotational drive gear during an opposite directional pivot of said pivot column.

7. A method of manually propelling a vehicle as recited in claim 1, the method further comprising a step of:

apply a rotational torque to said at least one rotational drive gear, wherein said rotational torque is applied to an upper portion of said at least one rotational drive gear during a first directional pivot of said pivot column and said rotational torque is applied to a lower portion of said at least one rotational drive gear during an opposite directional pivot of said pivot column.

8. A method of manually propelling a vehicle as recited in claim 1, the method further comprising steps of:

apply a first rotational torque to a first rotational drive gear, wherein said rotational torque is applied to an upper portion of said first rotational drive gear during a first directional pivot of said pivot column; and apply a second rotational torque to a second rotational drive gear, wherein said rotational torque is applied to a lower portion of said second rotational drive gear during a second directional pivot of said pivot column;

wherein said second rotational drive gear free-spins during application of said first rotational torque, and wherein said first rotational drive gear free-spins during application of said second rotational torque.

9. A method of manually propelling a vehicle, the method comprising steps:

obtaining an operator-powered vehicle, said operator-powered vehicle comprising:

a frame having a forward end terminating at a front fork receptacle, and a rear end, said frame is defined having a central frame section located between said forward end and a seat, wherein said seat is attached to said frame;

a front fork having a wheel supporting segment extending downward from said front fork receptacle;

at least one leading wheel rotationally carried by said wheel supporting segment;

at least one trailing wheel rotationally assembled to a trailing end of said vehicle;

a pivot column pivotally engaging with said central frame section, rotating about a horizontal axis that is substantially perpendicular to a longitudinal axis of said frame;

at least one rotational drive gear engaged with at least one of said wheels;

a propulsion system providing communication between said pivot column and said at least one rotational drive gear;

pivoting a pivot column, wherein said pivot column is in pivotally communication with a central location of said frame;

generating a first torque to a first rotational drive gear during a first pivot direction of said pivot column, wherein said first rotational drive gear torque rotates at least one wheel in a rotational direction, wherein said at least one wheel of a set of wheels, wherein said set of wheel are in rotational communication with said frame.

10. A method of manually propelling a vehicle as recited in claim 9, the method further comprising a step of:

generating a second torque to a second rotational drive gear during a second pivot direction of said pivot column, wherein said second rotational drive gear torque continues to rotate said at least one wheel in said rotational direction.

11. A method of manually propelling a vehicle as recited in claim 10, the method further comprising a step of:

changing a direction of at least one wheel of said set of wheels to steer said operator-powered vehicle by rotating a handlebar, wherein said handlebar is in rotational communication with and respective to an upper section of said pivot column.

12. A method of manually propelling a vehicle as recited in claim 10, the method further comprising a step of:

free-spinning said first rotational drive gear during application of said second torque; and free-spinning said second rotational drive gear during application of said first torque.

13. A method of manually propelling a vehicle as recited in claim 9, the method further comprising a step of:

changing a direction of at least one wheel of said set of wheels to steer said operator-powered vehicle by rotating a handlebar, wherein said handlebar is in rotational communication with and respective to an upper section of said pivot column.

14. A method of manually propelling a vehicle as recited in claim 9, the method further comprising a step of:

pushing an upper section of said pivot column away from said seat by a pressing against an upper propulsion member carried by said upper portion of said pivot column.

15. A method of manually propelling a vehicle as recited in claim 14, the method further comprising a step of:

pulling said upper section of said pivot column towards said seat by a pulling said upper propulsion member carried by said upper portion of said pivot column.

16. A method of manually propelling a vehicle as recited in claim 14, the method further comprising a step of:
    pushing a lower section of said pivot column away from said seat by a pressing a lower propulsion member carried by said lower portion of said pivot column.

17. A method of manually propelling a vehicle as recited in claim 9, the method further comprising a step of:
    pushing a lower section of said pivot column away from said seat by a pressing a lower propulsion member carried by said lower portion of said pivot column.

18. A method of manually propelling a vehicle as recited in claim 9, the method further comprising a step of:
    apply a rotational torque to said at least one rotational drive gear, wherein said rotational torque is applied to an upper portion of said at least one rotational drive gear during a first directional pivot of said pivot column and said rotational torque is applied to a lower portion of said at least one rotational drive gear during an opposite directional pivot of said pivot column.

19. A method of manually propelling a vehicle, the method comprising steps:
    obtaining an operator-powered vehicle, said operator-powered vehicle comprising a seat attached to a frame;
    pivoting a pivot column, wherein said pivot column is in pivotally communication with a central location of said frame;
    generating a first torque to a first rotational drive gear during a first pivot direction of said pivot column, wherein said first rotational drive gear torque rotates at least one wheel in a rotational direction to drive said operator-powered vehicle in a forward direction, wherein said at least one wheel of a set of wheels, is provided in rotational communication with said frame to enable steering of said operator-powered vehicle;
    generating a second torque to a second rotational drive gear during a second pivot direction of said pivot column, wherein said second rotational drive gear torque continues to rotate said at least one wheel in said rotational direction;
    free-spinning said first rotational drive gear during application of said second torque;
    free-spinning said second rotational drive gear during application of said first torque; and
    changing a direction of at least one wheel of said set of wheels to steer said operator-powered vehicle by rotating a handlebar, wherein said handlebar is in pivotal rotational communication with and respective to an upper section of said pivot column.

20. A method of manually propelling a vehicle as recited in claim 19, the method further comprising steps of:
    pushing an upper section of said pivot column away from said seat by a pressing against an upper propulsion member carried by said upper portion of said pivot column; and
    pushing a lower section of said pivot column away from said seat by a pressing a lower propulsion member carried by said lower portion of said pivot column.

* * * * *